(12) United States Patent
Chen

(10) Patent No.: US 7,019,869 B2
(45) Date of Patent: Mar. 28, 2006

(54) PAPERLESS IMAGE FAX-SCANNING APPARATUS

(75) Inventor: Michael Chen, Hsinchu (TW)

(73) Assignee: Avision, Inc., Hsinchu (TW)

( * ) Notice: Subject to any disclaimer, the term of this patent is extended or adjusted under 35 U.S.C. 154(b) by 825 days.

(21) Appl. No.: 09/899,819

(22) Filed: Jul. 9, 2001

(65) Prior Publication Data

US 2002/0054362 A1 May 9, 2002

(30) Foreign Application Priority Data

Jul. 7, 2000 (TW) .............................. 89113493 A

(51) Int. Cl.
*A47B 95/04* (2006.01)

(52) U.S. Cl. ...................... 358/402; 358/400; 358/401; 358/404

(58) Field of Classification Search ................ 358/402, 358/400, 401, 404, 407, 468, 442, 474, 476
See application file for complete search history.

(56) References Cited

U.S. PATENT DOCUMENTS

| | | | | |
|---|---|---|---|---|
| 5,396,341 | A | * | 3/1995 | Takahashi et al. .......... 358/400 |
| 6,055,067 | A | * | 4/2000 | Matsuda et al. ............ 358/468 |
| 6,487,611 | B1 | * | 11/2002 | Brusky et al. ................ 710/10 |
| 6,614,551 | B1 | * | 9/2003 | Peek .......................... 358/1.15 |
| 2005/0080932 | A1 | * | 4/2005 | Liu ............................. 709/249 |

FOREIGN PATENT DOCUMENTS

| | | |
|---|---|---|
| CN | 1069155 | 2/1993 |
| CN | 1154619 | 7/1997 |
| CN | 1205824 A | 1/1999 |
| EP | 0 756 414 A2 | 7/1996 |
| EP | 0756414 A2 | 1/1997 |
| TW | 353845 | 3/1999 |

* cited by examiner

Primary Examiner—Kimberly Williams
Assistant Examiner—Negussie Worku
(74) Attorney, Agent, or Firm—Rabin & Berdo, P.C.

(57) ABSTRACT

A paperless image fax-scanning apparatus includes: an image scanning unit utilized to scan documents to be scanned to generate image data; a faxing unit, when connected to a telephone line, utilized to transmit the image data generated from the image scanning unit or to receive image data via the telephone line; a data storage unit, which can be connected to a portable data storage medium, utilized to store the image data received by the faxing unit at the above mentioned portable data storage medium; an input interface, which includes at least one set of operation keyboards, utilized to input various operation signals into the paperless image fax-scanning apparatus; and a control unit utilized to control the operation of the image fax-scanning apparatus.

20 Claims, 4 Drawing Sheets

PAPERLESS IMAGE FAX-SCANNING APPARATUS

BACKGROUND OF THE INVENTION

This application incorporates by reference Taiwanese application Serial No. 89113493, Filed Jul. 7, 2000.

1. Field of the Invention

The invention relates in general to a paperless image fax-scanning apparatus, and more particularly to a paperless image fax-scanning apparatus without using any computer systems.

2. Description of the Related Art

The fax machine is a necessary apparatus of communication equipment in modern offices. Its simple and easy way of operation allows the user to complete the sending of images without learning complicated computer operations. In circumstances when a high standard of image quality is not required, such as when sending plain printed matters, manuscripts, securities, and notes or documents, the fax machine is a commonly used communication tool to send images. However, due to the limitations in technology and design, ordinary fax machines have the following disadvantages in terms of printing quality, efficiency of use, and cost.

In the aspect of printing quality and the aspect of cost: Ordinary fax machines adopt either thermal or non-thermal style printing methods. The thermal style printing method generates a poorer quality of printing; furthermore, the print fades out easily, and is difficult to be preserved for an extended period of time. Due to its low printing costs, most ordinary fax machines adopt the thermal style printing method instead of the non-thermal style printing method. The non-thermal style printing method, such as inkjet printing, generates a better printing quality as compared to the thermal style does. However, the inkjet printing method has a slower printing speed as well as a higher cost of consumable materials such as inkjet cartridges. As for other non-thermal style printing methods, the laser printing method for instance, is not popular, and is normally adopted only in high-priced fax machines because of its relatively higher costs.

In the aspect of user's efficiency of use: After receiving fax data, ordinary fax machines normally print it out. When receiving or printing, the telephone line of the fax machine cannot be used to send or receive another fax at the same time. Moreover, more time will be needed if the fax data is of large amount or if errors occur during the process of sending or receiving of fax data since the process needs to be repeated. In addition, when sending a fax, we need to redial again if the line of the receiving fax machine is engaged. Although ordinary fax machines have the automatic redial function, it is very likely that someone else may have an urgent need to send a fax at that time. In these circumstances, the two users need to negotiate with each other to achieve an agreement. Furthermore, more mutual negotiation and patience are needed if several users need to use the fax machine at the same time. In circumstances where several users use the same fax machine, manpower and time will be wasted, and the efficiency of work will decrease.

Although some high-priced fax machines have functions to solve the above-mentioned problems, e.g. time-setting sending and memory receiving functions, these functions are independent functions and are restricted inside a fax machine and cannot integrate with other computer peripherals to achieve an automatic, high efficiency and high quality working environment. When most of the computer processed documents need to be faxed, two solutions are currently available:

(a). Connect the fax machine with a computer and then fax documents through complicated operation procedures. This way does not need to have the documents printed out first, but is problematic for users who are not familiar with computer operations.

(b). Have the documents printed out first and then have them faxed in the conventional method. However, this method causes wastage of paper.

The scanner is a common peripheral in modern offices. Taking an ordinary flatbed scanner for instance, it needs to be controlled by a personal computer. The user needs to operate computer software to control the scanner and store the scanned results in the storage unit of a personal computer such as a hard disc for further processing. In spite of the fact that scanners with portable data storage media permitting scanned data to be stored at the data storage media of scanners have been developed, such scanners still cannot integrate with other computer peripheral resources and bring the high quality scan-output feature into full play, nor can such scanners combine this high quality scan-output feature with the functions of fax machines and the Internet. Therefore, such scanners have lower added value.

SUMMARY OF THE INVENTION

It is therefore an object of the invention to provide a paperless image fax-scanning apparatus to solve the drawbacks of ordinary fax machines and to fully utilize the features of ordinary image scanners. The paperless image fax-scanning apparatus combines the functions of a fax machine and the functions of an image scanner into one. By utilizing an image scanner as the input device of a fax machine and utilizing the data storage unit to store the fax data received and then output the fax data to another storage media to replace printing output, a paperless and high quality output can be achieved. The apparatus can be operated independently without the control of a personal computer. The easy operation features of the apparatus not only increase operation efficiency, but also permit those users not familiar with computer operations to easily complete the sending and receiving of faxes with a high level of efficiency and quality. Apart from that, the output of the image data that comes from the paperless image fax-scanning apparatus can be shared if the built-in network interface device of the paperless image fax-scanning apparatus is connected to a Local Area Network (LAN). In this way, the data can be processed by the network server, extending the functionality of the data, resulting in a highly automated and efficient working environment.

According to the object of the invention, a paperless image fax-scanning apparatus is provided. The paperless image fax-scanning apparatus includes: an image scanning unit to scan documents, a faxing unit connected to a telephone line, a data storage unit, an input interface including at least one set of operation keyboards, and a control unit.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
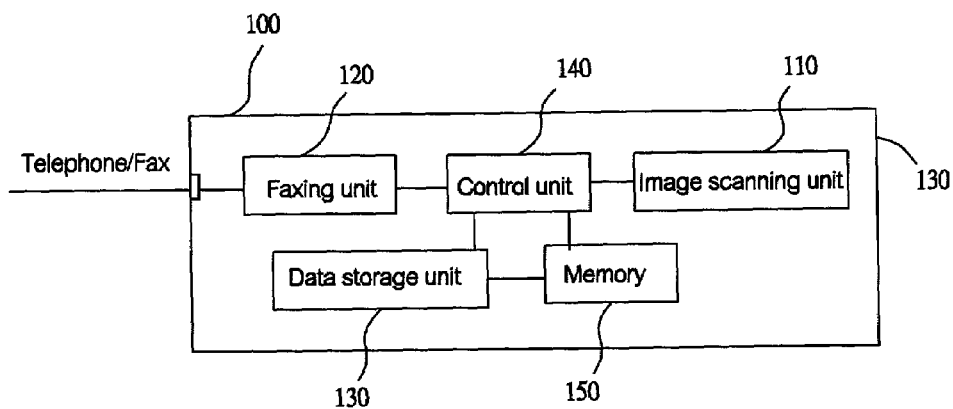
FIG. 1 is a block diagram of the paperless image fax-scanning apparatus according to a preferred embodiment of the invention.

Referring first to FIG. 1, a block diagram of the paperless image fax-scanning apparatus according to a preferred embodiment of the invention is shown. The paperless image fax-scanning apparatus 100 includes an image scanning unit 110, a faxing unit 120, at least one data storage unit 130, and a control unit 140. The image scanning unit 110, such as a flatbed scanner or a sheet-fed scanner, is utilized to scan documents to generate a digital image data of the documents. The faxing unit 120, such as an ordinary sending/receiving interface of a fax machine, is utilized to fax the above-obtained data and to receive incoming fax data when connected to a Public Switching Telephone Network (PSTN). The data storage unit 130, such as a removable hard disc interface or a floppy disc drive, e.g. a 1.44 MB disc drive, a Zip drive or an LS 120 disc drive, can be used in three ways:

(1). Write large amounts of data of the scanned documents into the data storage unit rapidly and wait to be faxed via the faxing unit 120 afterwards. In this way, users do not need to waste time queuing up.

(2). Write large amounts of incoming data into the data storage unit rapidly and wait for the designated recipients to make a copy of the data to their own computers. In this way, not only is wastage of paper reduced, but also increases the speed and capacity of fax receiving.

(3). Users can place the data of documents to be faxed in an appropriate data storage medium from their computers. After that, the users can bring their data storage media with them and place it in the data storage unit 130 of the paperless image fax-scanning apparatus 100. Stored data can then be read out from the data storage unit and then faxed via the faxing unit 120.

As for the control unit 140, it is utilized to control the operations of the paperless image fax-scanning apparatus as well as control the processing of various data stored in the data storage media. For example, the control unit performs image processing for these data to generate image files with image formats, Joint Photographic Experts Group (JPEG) for instance, and stores these image files at ZIP discs with a Zip drive. Another example is utilizing the control unit to transform image files with image format like JPEG, which are stored at data storage media, to faxable image data to be faxed by the faxing unit via a telephone network.

The paperless image fax-scanning apparatus 100 in the above-mentioned FIG. 1 further includes a memory device 150 utilized to store the processed data. For instance, the memory device 150 can be utilized to store data if the storage space of data storage media is insufficient. The memory device 150 can also be utilized to temporarily store data as well as to transfer the data to data storage media if the volume of data reaches a certain amount. In this way, the access time will be reduced. In addition, using a peripheral equipment interface (not shown in the figure), the image fax-scanning apparatus 100 can be further connected to other external peripheral equipment such as an external data storage device like Re-Writable Compact Disc (CD-RW) or Digital Versatile Disc—Random Access Memory (DVD-RAM). This function is disclosed in FIG. 4, Embodiment Two hereunder.

Figure 2:
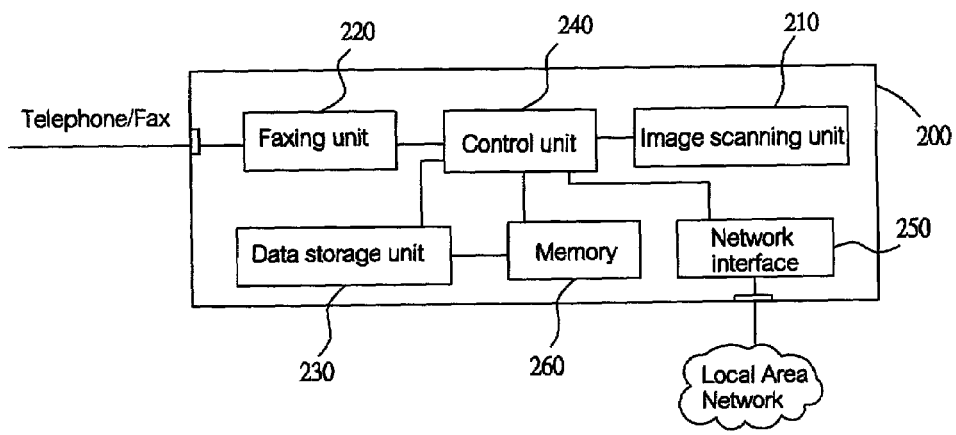
FIG. 2 is a block diagram of another paperless image fax-scanning apparatus according to a preferred embodiment of the invention.

As mentioned above, the paperless image fax-scanning apparatus as illustrated in FIG. 1 completes the scanning and faxing functions without requiring personal computers. To achieve another object of the invention, the paperless image fax-scanning apparatus is integrated with a network. Referring to FIG. 2, a block diagram of another paperless image fax-scanning apparatus according to a preferred embodiment of the invention is depicted. As shown in FIG. 2, the paperless image fax-scanning apparatus 200 includes an image scanning unit 210, a faxing unit 220, at least one data storage unit 230, a control unit 240, and a network interface 250. The paperless image fax-scanning apparatus 200 differs from the paperless image fax-scanning apparatus 100 described in FIG. 1 in that the former has a network interface 250, such as an Ethernet network card for instance. By means of the control unit 240, various data, including that received via the network interface 250, can be processed. Apart from receiving data, the network interface 250 can output data processed by the control unit 240. The paperless image fax-scanning apparatus 200 can be connected to networks to share its processed data. For example, utilizing the network interface 250 to connect the paperless image fax-scanning apparatus 200 to a Local Area Network (LAN), its functionalities can be harnessed by all users of the network.

The paperless image fax-scanning apparatus 200 as illustrated in FIG. 2 further provides a memory device 260 for the control unit 240 to utilize. The memory device 260 can be utilized to store data when the storage space of the original data storage media is insufficient, or if the network connection is suspended.

In the above-mentioned description, the invention presents a paperless image fax-scanning apparatus that completes the processing of faxing and scanning and outputs data to data storage media without requiring the control of a personal computer. Besides, the paperless image fax-scanning apparatus can be further connected to a network via the connection with other peripheral equipment. The details of these functions are illustrated in the following three embodiments; the ways of implementation and operation of these functions are disclosed as well.

Figure 3:
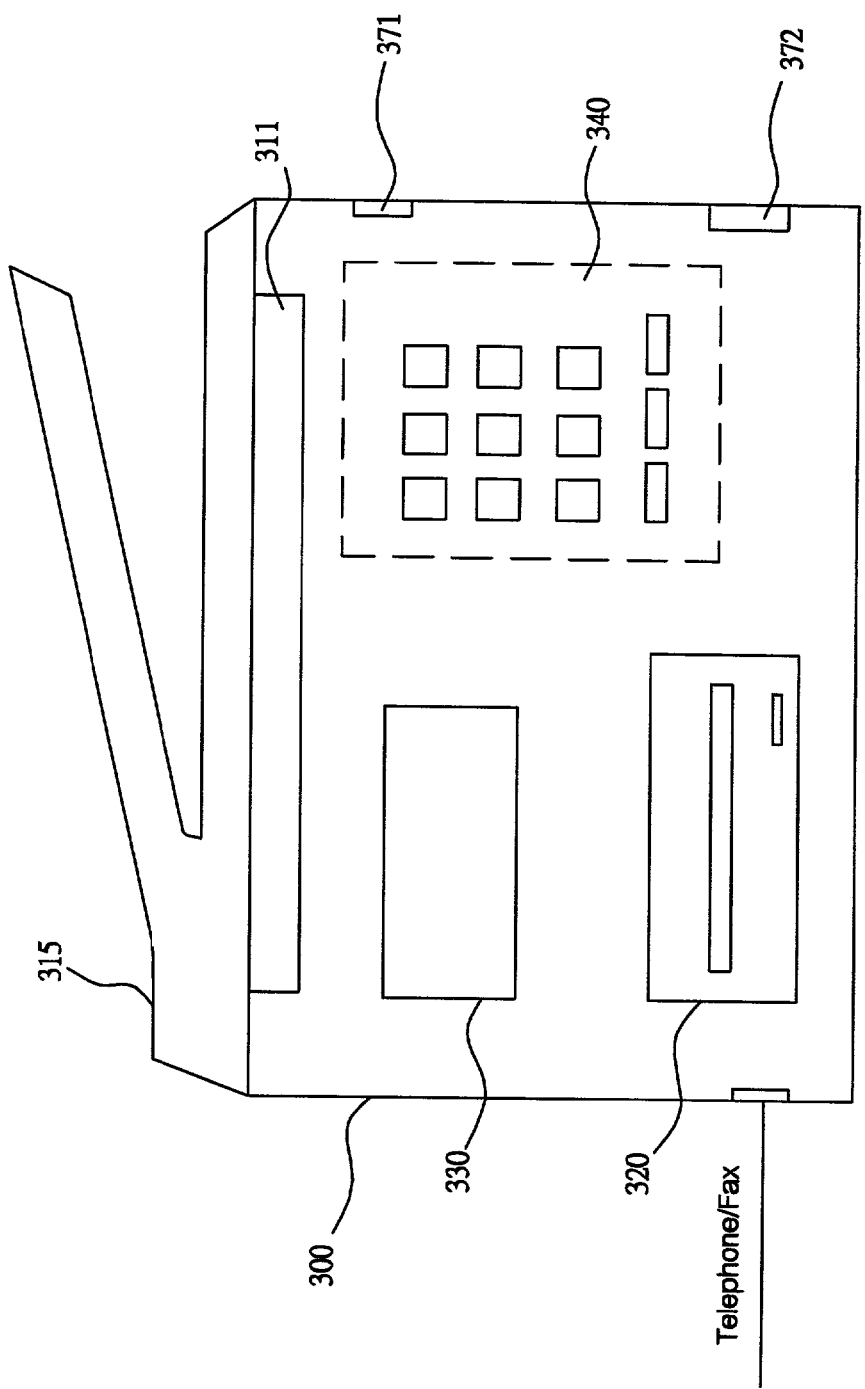
FIG. 3 is a functional diagram of the paperless image fax-scanning apparatus in FIG. 1 according to the first preferred embodiment of the invention.

Embodiment One:

Referring to FIG. 3, a functional diagram of the paperless image fax-scanning apparatus of FIG. 1. The paperless image fax-scanning apparatus 300, which integrates the functions of a flatbed scanner and a fax machine, includes a scanning unit and a faxing unit. Its faxing unit connects with a PSTN via a telephone line to send and receive faxes. Its scanning unit includes a scanning flatbed 311 and an Automatic Document Feeder (ADF) 315. The paperless image fax-scanning apparatus 300 uses a floppy disc drive 320 as its input/output device while a display panel 340 and an operation keyboard 340 are used as users' interfaces. Apart from a conventional keyboard, a wireless keyboard can be used as an embodiment of the operation keyboard 340; while a Liquid Crystal Display (LCD) panel for instance can be used as an embodiment of the display panel 330. In addition, the paperless image fax-scanning apparatus 300 utilizes a Universal Serial Bus (USB) interface 371 and a printer interface 372 to connect with other peripheral equipments. A control unit controls all the units and devices comprising the paperless image fax-scanning apparatus such that various faxing and scanning functions can be integrated to process the data.

As is shown in FIG. 3, the various components discussed in the paragraph above are disposed on the surface of a housing, with the exception of the control unit.

When a user wants to fax documents, he or she can put the documents on the ADF 315 and then press the operation keyboard 340 and the documents will be automatically fed into the ADF 315 and scanned. The user can also choose to put the documents on the scanning flatbed 311 page by page and have the documents scanned page by page accordingly. After the documents have been scanned, message will be shown in the display panel 330 to inform the user of the results of scanning, and the data of scanned documents will be faxed. At the same time, the user can either perform image processing on the data or store the data at a floppy disc. If the floppy disc is not in the floppy disc drive 320, or if the floppy disc runs out of its storage space, the data will be stored at the memory device of the paperless image fax-scanning apparatus.

Apart from that, the user can reset the system. The user can choose either to fax the data of scanned images stored in the removable storage media via a telephone line, e.g. the data of scanned images stored at floppy discs as described in this embodiment; or transform the image data stored in the data storage media first and then fax the transformed data of scanned images via a telephone line later. As described above, the control unit within the system controls all these functions and operations.

The user can selectively set the system to store the incoming faxes into a floppy disc directly or some other memory device for further processing.

As for ordinary document scanning functions, the scanning unit of the paperless image fax-scanning apparatus 300 independently completes the scanning and transfers the data to data storage media, thus saving computer operation procedures. In terms of operation convenience, using the paperless image fax-scanning apparatus is as convenient as using a photocopier. The only difference is that the data is copied to a disc in the form of digital image files rather than outputted onto paper. 60 KB to 80 KB memory space is needed for an ordinary fax of A4 size, therefore a 1.44 MB disc can store up to about 20 pages of fax data. As for high capacity floppy discs with capacity over 100 MB, e.g. discs utilized by floppy disc drives like Zip or LS120, at least 1,460 pages of fax can be stored. By means of the control unit of the paperless image fax-scanning apparatus 300, all the fax data can be transformed to general image formats, e.g. JPEG, which are used in ordinary personal computers or the Internet for further processing by other users. In this way, the consumption of paper will be greatly reduced and the reuse of data and consumable materials increased. As a result, work efficiency will be increased and costs reduced.

Figure 4:
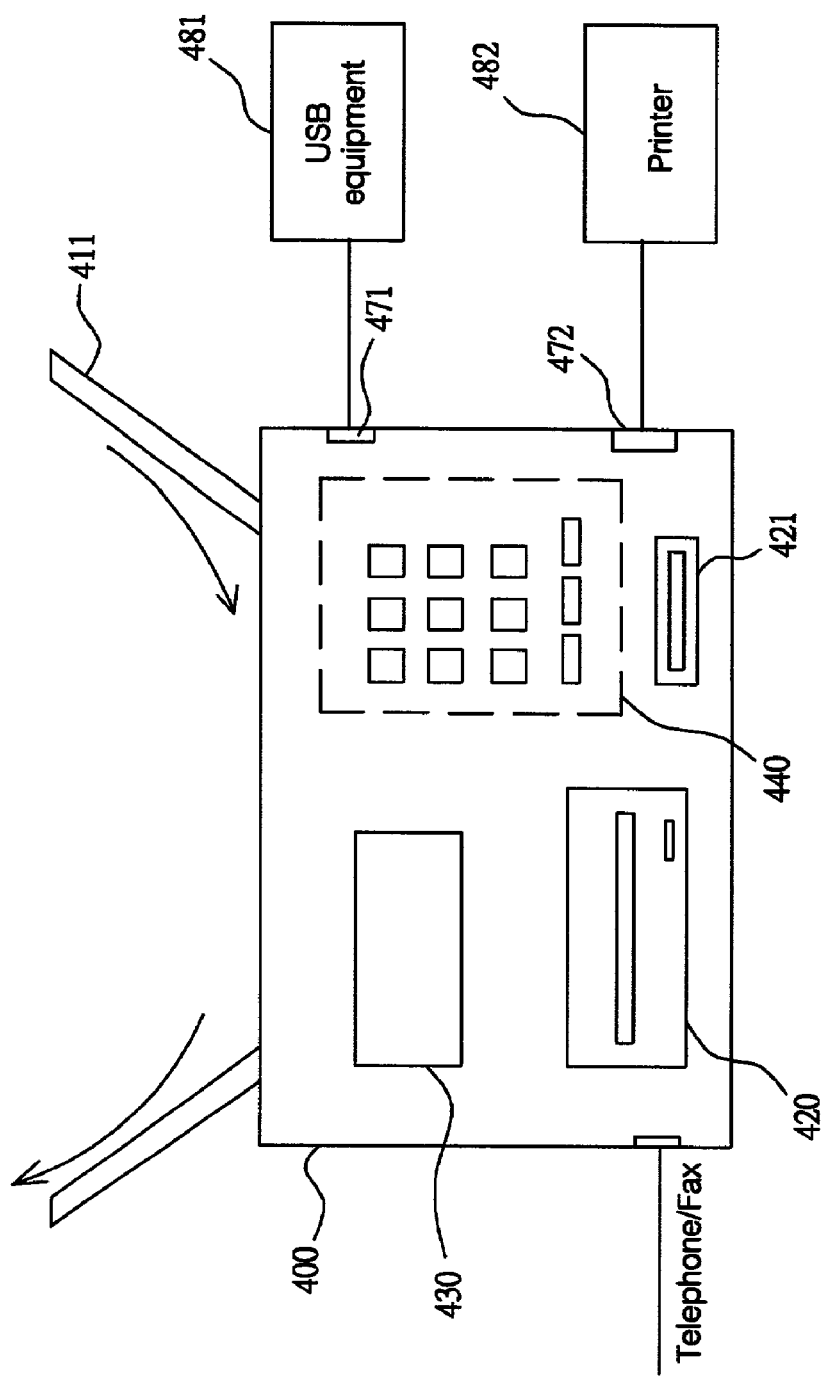
FIG. 4 is a functional diagram of the paperless image fax-scanning apparatus in FIG. 1 according to the second preferred embodiment of the invention.

Embodiment Two:

FIG. 4 is a functional diagram, other than FIG. 3, of the paperless image fax-scanning apparatus of FIG. 1. The paperless image fax-scanning apparatus 400, which integrates the functions of a sheet-fed scanner and a fax machine, includes a scanning unit and a faxing unit. Its scanning unit includes a paper tray 411 to guide the feeding of documents. A floppy disc drive 420 and a Personal Computer Memory Card International Association (PCMCIA) slot 421 are included as the input/output device; while a display panel 430 and an operation keyboard 440 are used as users' interfaces. Apart from that, a USB interface 471 and a printer interface 472 are utilized to connect with other peripheral equipment such as a USB device 481 and a printer 482.

As is shown in FIG. 4, the various components discussed in the paragraph above are disposed on the surface of a housing, with the exception of the USB device 481 and the printer 482.

Embodiment Two differs from Embodiment One in the following aspects. First, since Embodiment Two uses a sheet-fed scanner, which is smaller than the flatbed scanner used in Embodiment One, the structure of the paperless fax image scanner apparatus 400 is simplified and the cost of manufacture is reduced. Second, Embodiment Two uses the PCMCIA slot 421 to access PCMCIA cards, a flash memory card for instance.

One example of this embodiment's applications is when a news reporter needs to fax images taken with a digital camera to his or her news agency. The reporter first utilizes the built-in read/write functions of PCMCIA card of the camera to write the image data of the images into a flash memory card. Next, he or she inserts the flash memory card into the paperless image fax-scanning apparatus 400 and then fax the image data to the news agency. Another example of application is to store the fax data and the scanning data in a flash memory card first, then have this flash memory card inserted into a notebook personal computer for further utilization or processing.

In addition, the paperless image fax-scanning apparatus 400 further connects with the USB device 481 and the printer 482 permitting the user either to print the fax data or the scanned data through a printer, or store the data using the USB device 481. Of course, the paperless image fax-scanning apparatus 400 can be designed to comprise interfaces other than USB, a Small Computer System Interface (SCSI) for instance. Thus, the paperless image fax-scanning apparatus 400 can be connected to the CD-RW via the SCSI interface to store important faxes or scanned data in a compact disc. Compared with an individual fax machine or scanner, the paperless image fax-scanning apparatus 400 has a much higher added value in terms of the expansion of function and the convenience of use it provides. The paperless image fax-scanning apparatus 400 according to the invention integrates and utilizes the existing resources more efficiently.

The ADF 315 and the fold feeder 411 are taken as examples to enable the paperless image fax-scanning apparatus of the invention. However, the invention is not limited thereto. By the same token, even though the PCMCIA slot 421 is utilized and described in Embodiment Two, it can be used in Embodiment One as well.

Figure 5:
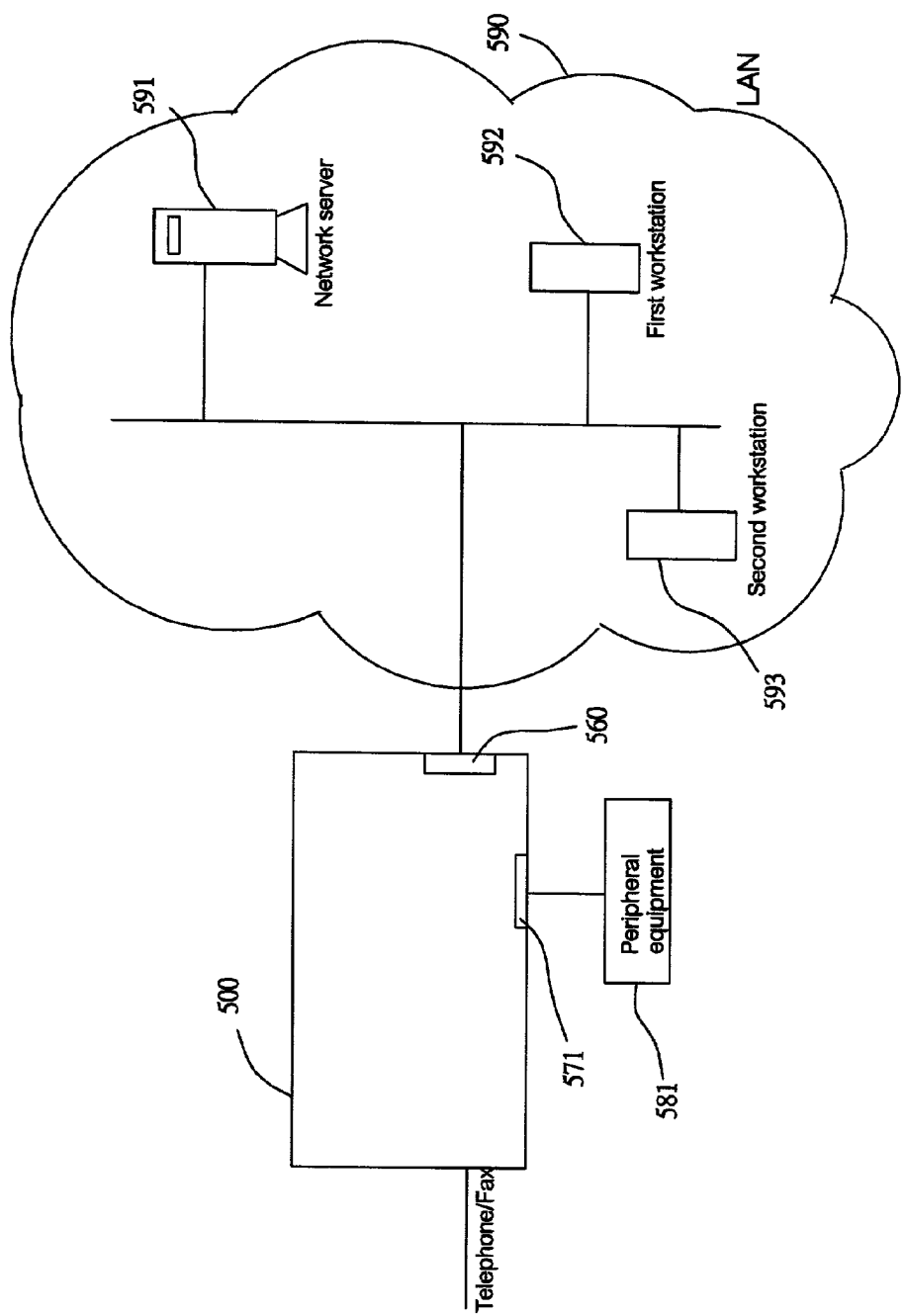
FIG. 5 is a functional diagram of the paperless image fax-scanning apparatus in FIG. 2 according to the third preferred embodiment of the invention.

Embodiment Three:

FIG. 5, a functional diagram of the paperless image fax-scanning apparatus in FIG. 2, is shown. The paperless image fax-scanning apparatus 500 outputs data to a network 590, a LAN with Ethernet protocol for instance, by means of a network interface 560 and controls the link between the network interface 560 and the LAN 590 through the control unit of the paperless image fax-scanning apparatus 500. Moreover, without using the controls of personal computers, the paperless image fax-scanning apparatus 500 as described in Embodiment One and Embodiment Two independently completes the functions of scanning and faxing, achieves a paperless output of faxes, scans and stores data in data storage media. The paperless image fax-scanning apparatus 500 can be further linked to other peripheral equipment 581 by means of the peripheral equipment interface 571.

As is shown in FIG. 5, the apparatus 500 comprises a housing, on the surface of which are the network interface 560 and the peripheral equipment interface 571.

As illustrated in FIG. 5, the paperless image fax-scanning apparatus 500 can be connected to the LAN 590 through the network interface 560, a LAN Ethernet protocol for instance. While the paperless image fax-scanning apparatus 500 is connected to the LAN 590, it becomes one of the network nodes of the LAN 590. Thus, that data can be shared with other network nodes, such as the first workstation 592 and the second workstation 593, by ways of using a network server 591 to store and share the data.

In another aspect, the control unit of the paperless image fax-scanning apparatus 500 includes sorting and screening functions to screen out some incoming faxes of unknown sources such as advertisements or private faxes to reduce the burden of network transmission. Since the demands for printing through network printers are reduced, the consumption of consumable materials such as paper will be decreased.

Through integration with an internal network, the paperless image fax-scanning apparatus 500 permits workstations of other networks to share the output of fax machines and image scanners. Using a network server to process the data of faxes and scanned images, various functions can be further extended to provide an automated and efficient working.

In the above-mentioned embodiments according to the invention, the paperless image fax-scanning apparatus integrates the functions of a scanner and a fax machine and utilizes data storage media to replace the necessary printing output device of a conventional fax machine. The consumption of paper in offices will be greatly reduced and the reuse of data and consumable materials increased. As a result, work efficiency will be increased and costs reduced. Compared with an individual fax machine or scanner, the paperless image fax-scanning apparatus has a much higher added value in terms of expansion of functions and convenience of use it provides. The paperless image fax-scanning apparatus integrates and utilizes existing resources more efficiently. Through integration with an internal network, a network server is utilized to process the data of faxes and scanned images; various functions can be further extended to provide an automated and efficient working environment.

While the invention has been described by way of example and in terms of the preferred embodiments, it is to be understood that the invention is not limited to the disclosed embodiments. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A paperless image fax-scanning apparatus, comprising:
   an image scanning unit for scanning a document to generate image data;
   a faxing unit connected to a telephone line for transmitting the image data generated from the image scanning unit or receiving fax image data via the telephone line;
   a data storage unit, which is connected to a portable data storage medium, for storing the fax image data received by the faxing unit in the portable data storage medium;
   an input interface, which comprises an operation keyboard for inputting operation signals into the paperless image fax-scanning apparatus; and
   a control unit for controlling the operation of the paperless image fax-scanning apparatus, wherein the control unit transfers the fax image data received by the faxing unit to the data storage unit and stores the fax image data in the portable data storage medium;
   wherein the paperless image fax-scanning apparatus excludes printing facilities that directly produce printout and is operable independently without control of a personal computer so as to save paper with the operation of the paperless image fax-scanning apparatus.

2. The paperless image fax-scanning apparatus of claim 1, further comprising:
   a network interface through which the paperless image fax-scanning apparatus is connectable to a Local Area Network (LAN).

3. The paperless image fax-scanning apparatus of claim 2, wherein the LAN is a Local Area Network with Ethernet protocol.

4. The paperless image fax-scanning apparatus of claim 1, further comprising:
   a printer interface for connecting the image fax-scanning apparatus to a printer through which the fax image data received by the faxing unit is printable.

5. The paperless image fax-scanning apparatus of claim 1, further comprising:
   a display panel for displaying operation data inputted by the user and the status of the image fax-scanning apparatus.

6. The paperless image fax-scanning apparatus of claim 1, further comprising:
   a peripheral equipment interface for connecting with peripheral equipment.

7. The paperless image fax-scanning apparatus of claim 6, wherein the peripheral equipment interface is a Small Computer System Interface (SCSI).

8. The paperless image fax-scanning apparatus of claim 6, wherein the peripheral equipment interface is a Universal Serial Bus (USB) interface.

9. The paperless image fax-scanning apparatus of claim 1, wherein the control unit selectively transfers the image data generated from the image scanning unit to the data storage unit and stores the image data in the portable data storage media.

10. The paperless image fax-scanning apparatus of claim 9, wherein the control unit is further able to selectively have the faxing unit transmit the image data stored in the portable data storage media via the telephone line.

11. The paperless image fax-scanning apparatus of claim 10, wherein the control unit is further able to selectively transform the image data stored in the portable data storage media to image data and have the faxing unit transmit the transformed image data via the telephone line.

12. The paperless image fax-scanning apparatus of claim 11, wherein the flatbed scanning device further comprising:
   an Automatic Document Feeder (ADF) corresponding to the flatbed scanning device.

13. The paperless image fax-scanning apparatus of claim 1, wherein the data storage unit is a floppy disc drive.

14. The paperless image fax-scanning apparatus of claim 1, wherein the data storage unit is a removable hard disc drive.

15. The paperless image fax-scanning apparatus of claim 1, wherein the data storage unit is a Personal Computer Memory Card International Association (PCMCIA) slot.

16. The paperless image fax-scanning apparatus of claim 1, wherein the data storage unit is a Re-Writable Compact Disc (CD-RW).

17. The paperless image fax-scanning apparatus of claim 1, wherein the control unit is further able to screen out received fax data to decide whether the fax data should be preserved or not.

18. The paperless image fax-scanning apparatus of claim 1, wherein the input interface wirelessly transfers operation signals inputted by a user to other parts of the image fax-scanning apparatus.

19. The paperless image fax-scanning apparatus of claim 1, wherein the image scanning unit is a flatbed scanning device.

20. A paperless image fax-scanning apparatus for use with a portable data storage medium; the apparatus comprising:
- a housing, the housing further including, either within the housing or at a surface of the housing:
  - an image scanning unit for scanning a document to generate image data;
  - a faxing unit operatively coupled to a telephone line connection at the surface of the housing, for transmitting the image data generated from the image scanning unit or receiving fax image data via a telephone line;
  - a data storage unit, further comprising, at the surface of the housing, a device accepting a portable data storage medium for storing the fax image data received by the faxing unit in the portable data storage medium;
  - an input interface at the surface of the housing, which comprises an operation keyboard for inputting operation signals into the apparatus; and
  - a control unit for controlling operation of the apparatus, wherein the control unit transfers the fax image data received by the faxing unit to the data storage unit and stores the fax image data in the portable data storage medium;
- wherein the apparatus excludes any printer and is independently operable by the control unit without connection to any personal computer.

* * * * *